United States Patent [19]

Hattori

[11] 4,428,112
[45] Jan. 31, 1984

[54] COIL INSERTER
[75] Inventor: Takatoshi Hattori, Nagoya, Japan
[73] Assignee: Mitsubishi Denki Kabushiki Kaisha, Tokyo, Japan
[21] Appl. No.: 297,194
[22] Filed: Aug. 28, 1981
[30] Foreign Application Priority Data
  Sep. 29, 1980 [JP] Japan .................. 55-135640
[51] Int. Cl.³ .......................................... H02K 15/06
[52] U.S. Cl. ....................................... 29/734; 29/736
[58] Field of Search ............... 29/734, 736, 732, 596, 29/564.1, 564.6

[56] References Cited
U.S. PATENT DOCUMENTS
3,626,432 12/1971 Fohl et al. ............................ 29/732
3,829,953 8/1974 Lauer et al. ...................... 29/736 X

*Primary Examiner*—Carl E. Hall
*Attorney, Agent, or Firm*—Oblon, Fisher, Spivak, McClelland & Maier

[57] ABSTRACT

A coil inserter including a plurality of tooling devices for inserting a coil and a plurality of wedges into each slot of an iron core, an actuator for driving the tooling devices and which is detachably connected to said tooling device, a tool stocker for selectively movably receiving the tooling devices depending upon the shape of said iron core, and a tooling device supporter having one end supported by a shaft mounted on the tool stocker so as to move are of the tooling devices to the tool stocker and to remove the another of the tooling devices from the tool stocker to engage the former with the actuator.

8 Claims, 6 Drawing Figures

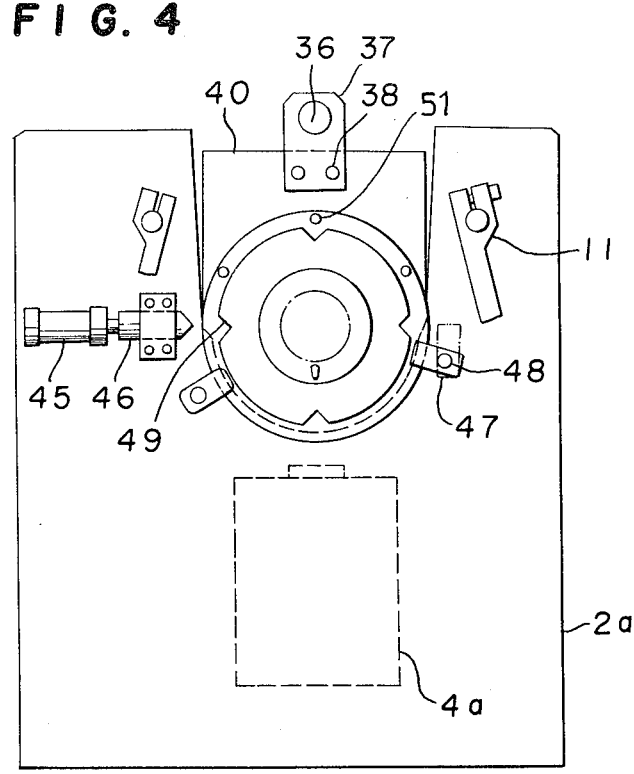
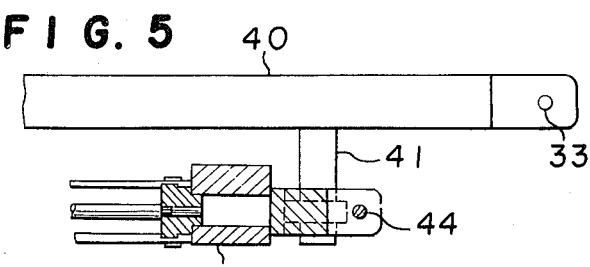
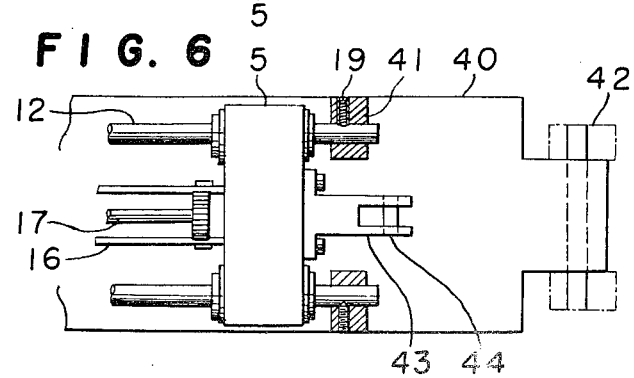

COIL INSERTER

BACKGROUND OF THE INVENTION

1. Field of the Invention

The present invention relates to a coil inserter used for preparing a stator of electric rotary machines. More particularly, it relates to a coil inserter for allowing easy replacement of the tooling devices when the inner diameter of the iron core of a stator, the shape of a slot and the number of slots of the stator are changed.

2. Description of the Prior Art

In a conventional coil inserter, it is necessary to replace a tooling device for inserting a coil and wedges and a wedge-cutting and shaping member when the inner diameter of the stator iron core, the shape of the slot and the number of slots are changed. There is a die set system in which the wedge-cutting and shaping member, that is, a wedge maker, is fitted to the tooling device. Accordingly, the present invention relates to a coil inserter having an improved tooling device for insertion.

FIGS. 1 and 2 illustrate the conventional coil inserter. The structure of the coil inserter will be described as follows: a tooling device 1 is mounted on a main body 3 so as to be turnable by a turning actuator 8. Tooling device 1, which holds an iron core 10 of a stator at the top thereof so as to insert a coil and insulating wedges in each slot of the iron core, includes an upper tool 9 for guiding the coil and the wedges, a magazine 70 for holding the wedges cut and shaped by a wedge maker 4, a pusher 16 for inserting the wedges held by magazine 70 into the slot, an inserting block 5 which holds pusher 16 and has a pushing rod 17 for inserting the coil at the central part thereof, and further a lower tool 18 including a guide bar 12 for guiding inserting block 5.

Tooling device 1 has an upper portion thereof covered by a front plate 2 using bolts, and a lower portion connected to a fitting plate 14 which is secured with bolts at the extreme end of the coil and a wedge-inserting actuator 7 from which guide bars 12 extend. Guide bars 12 are set by screws 19 on fitting plate 14 and are connected to inserting block 5 by a coupling 6 spaced from rod 7a of inserting actuator 7.

In the conventional apparatus, replacement of the tooling device 1 for inserting is carried out as follows: upper bolts (not shown) for fastening front plate 2 and a tool-fitting (not shown) for preventing dislodging of tooling device 1 are respectively removed and tooling device turning actuator 8 is actuated to lower the tooling device through the openings of the front plate 2 and main body 3 so as to bring it to the position shown by the dotted chain line (the position shown by reference number 1a in FIG. 1). The coupling is turned to remove the inserting block 5 under tooling device 1 from rod 7a of inserting actuator 7 and screw 19 is turned to disengage the connection between fitting plate 14 and guide bars 12. During removal of tooling device 1a, the operator has to be in a half-crouching posture. Because the tool of tooling device 1a weighs in the range of 80 and 120 kg., such removal is dangerous unless removal is carried out with the cooperation of two or three operators or with the use of a crane. Thus, tool 1a is removed to replace it with another tool which is used to insert the coil and wedges into the iron core of a separate stator. In order to perform the replacement operation, such is carried out in reverse order to the removal operation.

When the tools required to cut and shape the wedges are mounted on wedge maker 4, all the tools are replaced in this replacement operation, whereas when the tools are assembled in the upper part of magazine 70 of the tooling device in the die set system, such are replaced during the replacement of the tooling device for insertion.

After replacement of the tooling device and the associated tools for cutting and shaping the wedges have been completed, the fine adjustments of the sliding length of the tool, the condition of the shaped wedges and the feeding length of the wedges have to be carried out before coil-inserting operation starts. In the conventional coil inserter having the structure described above, a great deal of labor and operating time (planning and replacing time) are required for replacing the tooling device, more specifically, such takes about two hours for two operators. Greater technique is also required for the fine adjustments in that the tooling device has to be slidable by a suitable length after the front plate is fitted, such requirements almost always resulting in delay of mechanization of the wiring operation for particular electric rotary machines which include many variations in construction and are produced in small lots.

SUMMARY OF THE INVENTION

It is an object of the present invention to provide a coil inserter enabling even a single operator to safely replace a tooling device by another tooling device matching the shape of an iron core in a small amount of time without any lifting machine such as a crane being necessary.

Another object of the present invention is to provide a coil inserter without requiring any fine adjustment after having replaced the tooling device.

A further object of the present invention is to provide a coil inserter suitable for the manufacture of different types and is small lots of electric rotary machines.

The foregoing and other objects of the present invention have been attained by providing a coil inserter which includes tooling devices for inserting a coil and wedges into each slot of an iron core, and actuator for driving said tooling device by detachably connecting the tooling device, a tool stocker for movably receiving the tooling devices which are selected depending upon the shape of the iron core, and a tooling device supporter having one end pivotally supported on a shaft mounted on the tool stocker so as to move one of the tooling devices to the tool stocker and to remove another of the tooling devices from the tool stocker to engage the former with the actuator.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts through the several views and wherein:

FIG. 4 is a front view of part of the coil inserter of the present invention in the direction indicated by arrow B in FIG. 3, FIG. 5 is a side view of a lower part of the tooling device in FIG. 3, and FIG. 6 is a front view of FIG. 5.

DETAILED DESCRIPTION OF THE PREFERRED EMBODIMENT

Figure 1:
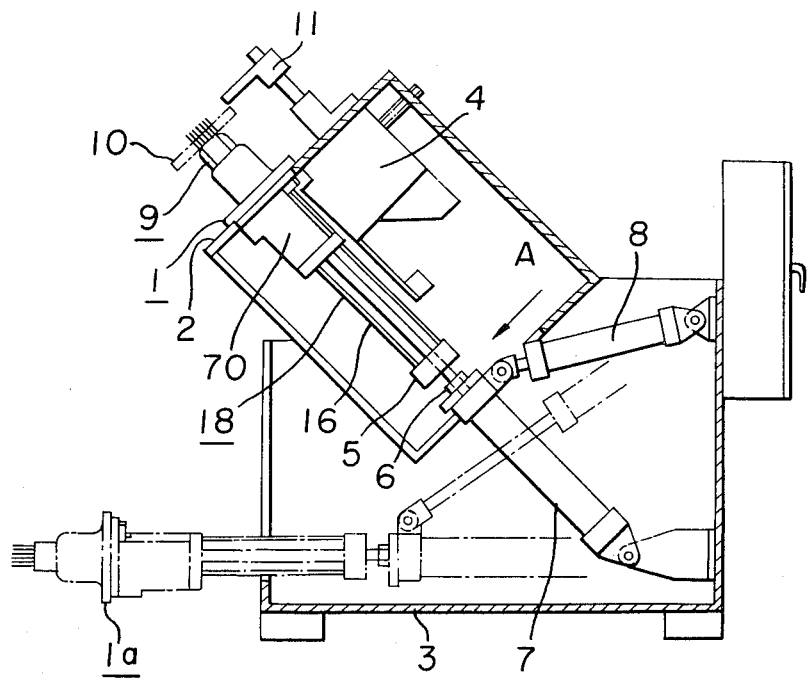
FIG. 1 is a side view of the conventional coil inserter.
Figure 2:
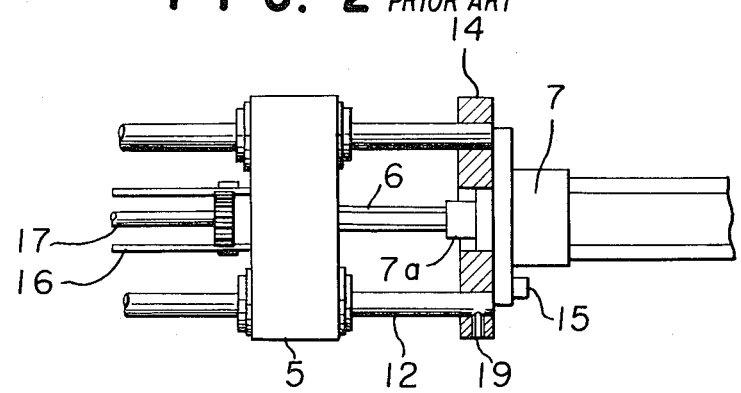
FIG. 2 is a plan view of a part of the conventional coil inserter in the direction indicated by arrow A in FIG. 1.

An embodiment of the present invention will now be described with reference to FIGS. 3 to 6. The same reference numbers as set forth in FIGS. 1 and 2 designate the same or corresponding parts. In the Figures, reference number 32 designates a tool stocker placed in the rear portion of a main body 3a. A stocker base 31 is rotatably held by both an upper radial bearing 28 and a lower thrust bearing 27 which are fitted around a main shaft 25 secured to main body 3a by bolts 26. Stocker base 31 is provided with a holder 42 at the lower part thereof. A pivotal shaft 33 of the holder 42 serves as the fulcrum point around which a tooling device supporter 40 can turn. The tooling device supporter 40 having pivotal shaft 33 as the turning center has its upper part connected with an upper tool 9a using a bolt 51. A guide bar 12 of a lower tool 18a is fixedly held by a screw 19 on a supporter 41 of the tooling device supporter.

A tooling device 20 whose position is determined by the holder 42 is held by a shifting member 21 of a shift actuator 22 in a predetermined position in an upper opening of a front plate 2a. At this stage, a shaft 44 of a yoke 43 below tooling device 20 is engaged with a hook 24 having a recess which is connected at the top of the inserting actuator 23 and forward and backward movement of inserting block 5 during insertion of the coil and wedges depends upon movement of hook 24. A separate tooling device 50 for replacement held on tool stocker 32 is prevented from disengagement by engagement of a latch 35 mounted on stocker base 31 with a pin of the tooling device supporter 40. Furthermore, the main shaft 25 is keyed at the upper part thereof to prevent it from rotating and a cam follower 36 fastened to tooling device supporter 40 by a fitting piece 37 secured by a bolt 38 extends inside circular side wall 29b of tool guide 29 secured by a bolt 30. Thus double safeguarding can be attained in order to prevent the disengagement of tooling device 50.

Wedge-cutting and shaping die set blocks 39, 39a . . . are mounted on respective tooling devices 20, 50 (the total number of such devices can be greater) and each distance H to the center of the tooling device is constant so that a wedge maker 4a can operate at a fixed position.

Tool-replacing operation and running movement of the coil inserter having the described tool stocker will now be described. First of all, bolt 48 of a tooling device holding plate 47 is released and holding plate 47 is turned to the position shown by the dotted chain line to allow removal of plate 47. An acutator for actuating a knock member is actuated to move backward to remove a knock 46 from knock groove 49 of tooling device 20. Then, the part connecting (not shown) wedge maker 4a to the wedge-cutting and shaping die set block 39 is removed to make shift actuator 22 (FIG. 3) extend if inserting block 5 is in the lowest position so that the shifting member 21 fixed at the top makes pin 34 turn around pivotal shaft 33 as the fulcrum point of stocker base 31. Thus, tooling device supporter 40 is raised so as to be flush with the upper surface of stocker base 31.

Figure 3:
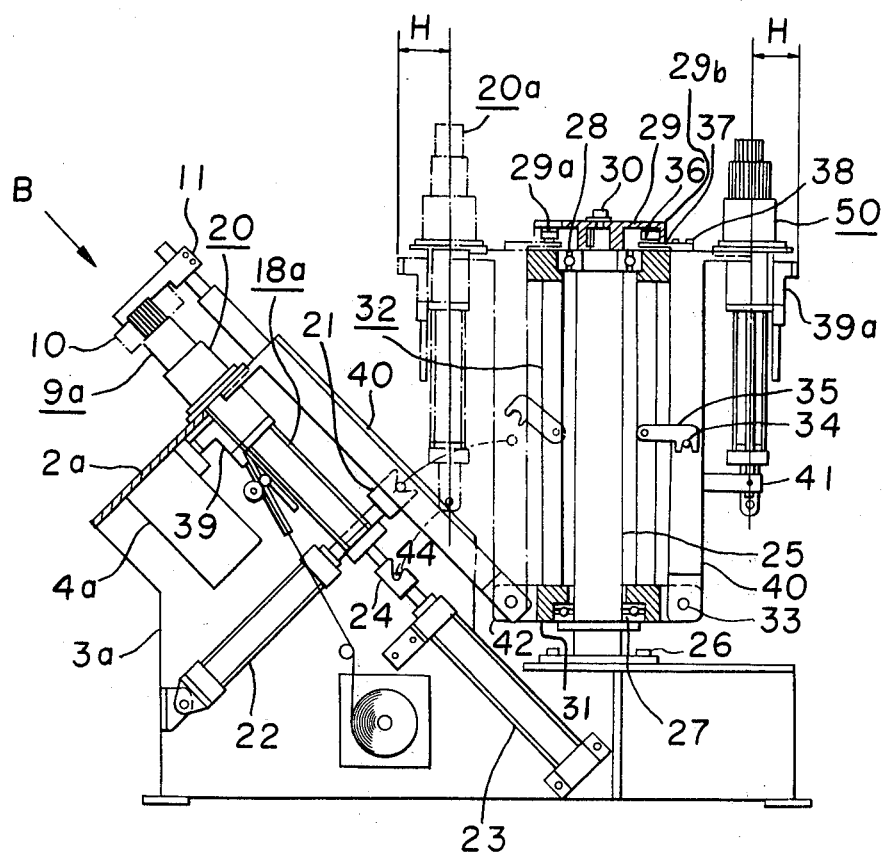
FIG. 3 is a side view of a coil inserter having tool stockers in accordance with the present invention.

The position of the tooling device at this stage is indicated be reference number 20a in FIG. 3. At this position, latch 35 is connected with pin 34 to prevent disengagement of the tooling device and shift actuator 22 is retracted.

A second pin (not shown) for determining the rotational position of stocker base 31 is removed and the pin is then again inserted after the separate tooling device 50 is turned to a shift position for replacement. During turning movement, cam follower 36 for preventing disengagement of tooling device 20 which has returned to stocker base 31 is guided through opening 29a inside tool guide 29 so as to act as a double safeguard, whereas cam follower 36 for tooling device 50 extends out of opening 29a from the inside of tool guide 29 for replacement.

Shift actuator 22 is advanced until shifting member 21 strikes pin 34. When the shifting member strikes pin 34 latch 35 is disconnected and shift actuator 22 is moved backwards whereby tooling device 50 is shifted to the opening of the front plate 2a for replacement and lower shaft 44 of the toolng device 50 is engaged with hook 24 at the top of inserting actuator 23 thereby bringing upper tool 9a into the center of front plate 2a. Subsequently, actuator 45 for actuating the knock member is actuated to fit knock member 46 into knock groove 49 of tooling device 50 and tooling device holding plate 47 is turned to hold the tooling device by fastening holding plate 47 with bolt 48.

The position of the wedge maker 4a to the tooling device is constant because the distance H from the center of the tooling device is fixed, so that it is sufficient to simply connect the connecting part of wedge-cutting and shaping die set block 39a. Thus, the entire tooling device replacing operation is completed.

In running operation, wedge maker 4a is actuated to feed a hoop of a required length so that wedge-cutting and shaping die set block 39a is actuated to hold the wedges in the magazine. Then setting of the coil and setting of stator iron core 10 on the upper tool are carried out and fitting metal 11 for stator iron core 10 is actuated. Finally, inserting actuator 23 is actuated. Thus, the coil and the wedges are ready for insertion within a short time. The device of this embodiment allows a single operator to complete the replacing operation within six to nine minutes without using a crane.

In the above embodiment, the tool stocker can be rotated as shown in FIG. 3. However, it is possible to employ a sliding system in which a plurality of the tool stockers are arranged in lateral alignment. The tool stockers can be automatically rotated by a rotating actuator even though the tool stocker is manually moved in the above embodiment.

As described above, in accordance with the present invention, tooling devices can be replaced with easy operation and without any fine adjustment within a relatively short time and also provide highly safe operation because of there being no need for manual replacement of the heavy tooling device and no need for crane operation in cases in which the inner diameter of stator iron core 10, the shape of slot and the number of slots are varied.

The coil inserter of the present invention remarkably reduces operation time required for replacing tooling device and, more particularly, provides a great advantage in improving productivity in cases in which different wiring operations have to be carried out for preparing different types and small lots of particular electric rotary machines (such as a motor).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A coil inserter for an iron core having a plurality of slots formed therein comprising:
   a plurality of tooling devices for inserting a coil and a plurality of wedges into each of said plurality of slots in said iron core;
   actuator means for driving said tooling devices and which is detachably connected to said tooling devices;
   a tool stocker having a shaft connected thereto for selectively movably receiving a first tooling device said tooling devices depending upon the shape of said iron core; and
   a tooling device supporter having one end supported by said shaft connected to said tool stocker for moving a second tooling device of said tooling devices to said tool stocker and for removing said first tooling device from said tool stocker so as to engage said tooling devices with said actuator means.

2. A coil inserter according to claim 1 further comprising means for rotating said first tooling device around said tool stocker.

3. A coil inserter according to claim 1 further comprising a rotary acutator for turning said first tooling device around said tool stocker.

4. A coil inserter according to claim 1 further comprising means for slidably receiving said second tooling device in said tool stocker.

5. A coil inserter according to claim 1, 2, 3 or 4 wherein said first tooling device further comprises a plurality of tooling devices and further comprising means for holding said plurality of said tooling devices on said tool stocker.

6. A coil inserter for an iron core having a plurality of slots found therein comprising:
   a plurality of tooling devices for inserting a coil and a plurality of wedges into each of said plurality of slots in said iron core;
   actuator means for driving said tooling devices and which is detachably connected to said tooling devices;
   a main body operatively associated with said actuator means;
   a cam follower operatively associated with said main body;
   a main shaft having a first end thereof secured to said main body;
   a stocker base member rotatably mounted on said main shaft;
   a tool guide secured to a second end opposite said first end of said main shaft to engage said cam follower for preventing disengagement of said tooling devices;
   a tool stocker, having a shaft connected thereto, for movably receiving a first tooling device of said tooling devices selected depending upon the shape of said iron core;
   a tooling device supporter rotatably supported by said shaft of said stocker base to hold said first tooling device of said plurality of tooling devices and having a pin member; and
   a shift actuator engageable with said pin member for removing said first tooling device from said tool stocker.

7. A coil inseter according to claim 6 wherein said stocker base member further comprises a latch engageable with said pin of said tooling device supporter.

8. A coil inserter according to claim 7 wherein said tooling stocker further comprises an upper tool for guiding said coil and said wedges; a pusher member including a pushing rod for inserting said wedges into said slots; an inserting block member holding said pusher and said pushing rod for coil insertion; and a guide bar for guiding said inserting block member.

* * * * *